United States Patent [19]

Brandt et al.

[11] 4,056,679

[45] Nov. 1, 1977

[54] SODIUM FILLED FLEXIBLE TRANSMISSION CABLE

[75] Inventors: Thomas F. Brandt, Swarthmore; Philip C. Netzel, Milmont Park, both of Pa.; Lennard Wharton, Winnetka, Ill.

[73] Assignee: I-T-E Imperial Corporation, Spring House, Pa.

[21] Appl. No.: 726,847

[22] Filed: Sept. 27, 1976

[51] Int. Cl.[2] .......................... H01B 5/00; H01B 9/00; H02G 15/02

[52] U.S. Cl. ...................................... 174/13; 138/113; 174/74 R; 174/DIG. 7

[58] Field of Search ............... 174/13, 126 CP, 131 R, 174/131 A, DIG. 7

[56] References Cited

U.S. PATENT DOCUMENTS

| | | | |
|---|---|---|---|
| 2,099,407 | 11/1937 | Mildner | 174/13 |
| 3,349,832 | 10/1967 | Crowdes et al. | 174/DIG. 7 X |

FOREIGN PATENT DOCUMENTS

| | | | |
|---|---|---|---|
| 25,203 | 12/1901 | Switzerland | 174/DIG. 7 |
| 345,495 | 3/1931 | United Kingdom | 174/13 |

*Primary Examiner*—Laramie E. Askin
*Attorney, Agent, or Firm*—Ostrolenk, Faber, Gerb & Soffen

[57] ABSTRACT

A corrugated flexible thin copper tube filled with sodium has a resilient flexible core along the axis thereof so arranged that it will contract and expand to take up the force of thermal expansion and contraction of the sodium. Since the coefficients of expansion of the sodium and copper are different, the absorption of this differential in force by the core prevents rupture of the copper tube and the formation of voids and hot spots within the copper tube.

11 Claims, 7 Drawing Figures

10
11
12
20
21
22
30
40
41
45
50
51
53
120
121
121a
122
220
320
420
430
2
7

SODIUM FILLED FLEXIBLE TRANSMISSION CABLE

BACKGROUND OF THE INVENTION

The present invention relates to sodium conductors and more particularly to sodium-filled flexible transmission cable in which the outer container is a flexible corrugated copper casing filled with the sodium. One of the major problems which arises in the construction and utilization of such cables is the differential in the coefficient of expansion between the sodium on the one hand and the copper on the other hand. Sodium sustains 4% volume change from room temperature through its melting point. In casting a sodium cable in a fixed or corrugated metal tube it has been observed that uncontrolled voids have been formed in the sodium on cooling. This may produce a conductor which could develop undesired hot spots.

Another problem arising from this 4% volume change occurs where a solid sodium conductor is cast in a fixed or corrugated or other flexible metal tube. Extremely large hydrostatic forces may rupture the enclosure. Even if the enclosure is made compliant, the large differential expansion between the sodium conductor and its support system may cause breakage or unacceptable distortion as, for instance, snaking of the conductor or parts thereof.

BRIEF DESCRIPTION OF THE INVENTION AND OBJECTS

The present invention has for its primary object the introduction of a compliant core to be introduced into the sodium space prior to casting. The range of useful compliance is approximately equal to or greater than the 4% volume changes of the sodium. This, it has been found, solves the problem stated above. After the sodium has been cast into the copper housing, then on cooldown the already voided space of the complaint core should expand, producing a larger voided space where desired, mainly at the core, and providing a void-free sodium volume.

The plasticity of the sodium itself contributes to the effectiveness of this solution. When the sodium conductor cast in this manner is subjected to elevated temperatures of operation, the above process is reversed with relatively low thermal expansion forces exerted on the casing or container. For example, the Brinell hardness of sodium at room temperature is consistent with the yield strength of 100 psi. At elevated temperature, the yield strength will substantially decrease. This value and this trend will reduce the thermal expansion forces by orders of magnitude compared to the cable with the solidly filled metal tube.

The compliant core may come in several forms but should be compatible with the sodium, its enclosure, and the method of fabrication. For example, the compliant core could take the form of an elliptical tube of polypropylene initially 35.62 mm × 62 mm for 100 mm sodium conductor cased in a corrugated copper sheath 0.6mm wall thickness. It may be advantageous to slightly backfill the elliptical tube or compliant core with nitrogen gas and to bulkhead the nitrogen by heat-sealing sections, for instance, at every 30cm interval so as to maintain a uniform distribution of gas when the casting takes place. The core should be adequately supported within the sodium body so as to maintain position at the center of the sodium conductor. In the present invention, this is achieved by spiders that support the initially elliptical tube. It may also be necessary to stiffen the tube with an internal or external rod from one spider to the next.

The advantage of the present system is that it provides a relatively low-cost reliable solution to the problem of the thermal expansion of sodium for high-powered transmission applications.

Thus the object of the present invention is the provision of a flexible, expandable core for a sodium-filled flexible conductor with the expandable flexible core being so arranged that it may be filled with an inert gas and will permit variations in the volume of the sodium owing to variations in temperature to vary the size, or the interior volume of the flexible core without exerting disruptive forces on the copper or other flexible casing which may be a corrugated or other flexible casing.

Another object of the present invention is the provision of means for appropriately centering the flexible core in the conductor, which may itself be flexible.

BRIEF DESCRIPTION OF THE FIGURES

The foregoing and many other objects of the present invention will become apparent in the following description and drawings, in which.

DETAILED DESCRIPTION OF THE INVENTION

Figures 1, 2, 3, 4, 5, 6, 7:
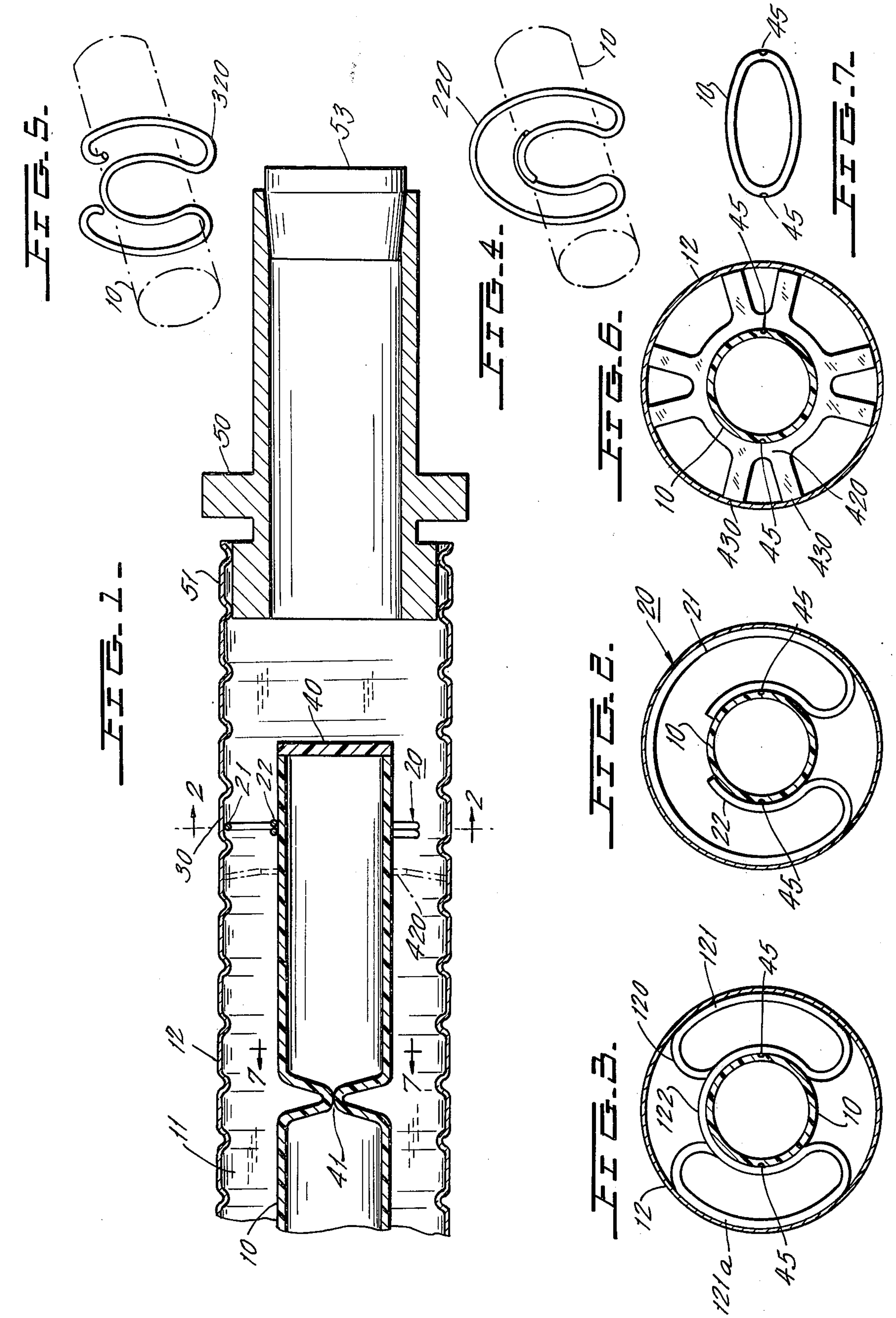
FIG. 1 is a longitudinal cross-section through a sodium-filled flexible copper conductor showing the utilization of the core which forms an appropriate and controllable void at the axis of the sodium-filled structure.
FIG. 2 is a cross-sectional view taken from line 2—2 of FIG. 1, looking in the direction of the arrows, and showing a support member for the flexible voided core, which provides appropriate room for expansion of the sodium contained within the casing.
FIGS. 3, 4, and 5 are modified forms of the spacer of FIG. 2.
FIG. 6 shows a further modified form of spider, or spacer which may be substituted for the structure of FIGS. 2, 3, 4, and 5.
FIG. 7 is a cross-sectional view taken on line 7—7 of FIG. 1, looking in the direction of the arrows of a portion of the flexible core in its initial uncompressed condition.

Referring to FIGURES, and especially FIG. 1, essentially the present invention is directed to the introduction of a compliant core 10 into the sodium space 11 within the flexible conductor casing 12 prior to casting of the sodium. The compliant core 10 should have a range of useful compliance approximately equal to or greater than the 4% volume changes expected of the sodium. The compliant core may have an initially elliptical cross-section, as shown in FIG. 7, it may have a circular cross-section, or it may have any other desired cross-section, provided the compliant core has sufficient inherent strength and stability to seek to return to any initial position which it has occupied before it might have been deformed. Sodium is cast in molten form into the space 11, the center of which is occupied by the compliant core 10. The sodium, obviously being melted at the time of casting, is at 104% greater volume than the volume it will occupy at room temperature. Preferably therefore, the compliant core 10, which essentially is a flexible, expandable pipe right down the middle of the conductor 12, may be compressed slightly by the metallic sodium as it is poured into the conductor casing 12.

The shape of the core piece 10 is initially elliptical since in this form it occupies a smaller volume. As the sodium cools down, it will shrink and the center core should then become round as it grows in volume. Then when the sodium is again heated the center core piece should once more assume an elliptical shape and a consequent reduction in volume. The tube 10 which forms the inner core has longitudinal notches 45 in two opposite sides. These notches are so placed to aid in assuring that the round tube will assume the elliptical shape. Since the tubing wall is reduced in the area of the notches, bending should occur here first.

The essential element of the present invention is that, as the sodium cools after being cast, thereby reducing its volume by as much as 4%, the compliant core will expand to take up any void that is produced, thereby obviating any hot spots or any other deleterious formations in the sodium.

As the sodium thereafter heats up during transmission of current and expands, instead of permitting expansion to occur to such an extent that possible rupturing pressure is applied to the flexible copper casing 12, the compliant core 10 may be squeezed down by the expanded sodium and will be squeezed down so readily that no substantial stress will be applied to the copper casing 12.

Accordingly, the utilization of the compliant core 10 provides, in effect, a safety area for the expansion and contraction of the sodium inside the copper casing while obviating the formation of voids in the composite conductor.

In order to maintain the compliant core 10 appropriately centered in the casing 12 so that the sodium conductor will be substantially an annular conductor, supports may be provided at desired intervals. Such support may consist of the spring member 20 which has an approximately 270° run 21 and another internal substantially 270° run 22 which may be snapped over the compliant core 10 at the time the compliant core is inserted into the corrugated conductor 12. It will be obvious that since the member 20 is a spring member, it may be squeezed down inside the outer conductor, or casing 12, and moved to the desired position and then permitted to snap out, preferably into one of the corrugations, or flutes 30 of the casing 12, so that the spring member may readily be held therein and serve to resiliently maintain the compliant core 10 in position.

FIG. 3 shows another form of the spring member of FIG. 2 in which the spring member 120 has a pair of lobes **121, 121*a* which will engage the interior of the casing 12, and these are connected integrally with a spring section 122 which will encase and receive the compliant core 10, encasing approximately 270° thereof. The spring lobes 121, 121*a* will now serve to center and support the compliant core 10 in the same manner as the structure of FIG. 2.**

FIGS. 4 and 5 show alternate structures for spring member supports 220 (FIG. 4) and 320 (FIG. 5) in which different formations of the lobe elements of the spring are provided. The outer section of each spring member will engage the casing 12 while the inner section will provide a substantially 270° encasement of the compliant core 10.

Arranging the spring members of the type shown in FIG. 2 or the various types shown in FIGS. 3, 4, and 5 at regular intervals along the interior of the casing 12 in order to support the compliant core 10 should serve to maintain the compliant core appropriately centered and prevent snaking of the compliant core within the casing 12.

It is possible to insert a stiff rod down the center of the compliant core in order to prevent snaking of the compliant core itself, but this stiff rod must itself be supported either within the compliant core and by other elements similar to the various spiders shown in FIGS. 2 through 6, and will also provide the appropriate structure needed to prevent voids from occurring.

Essentially, as pointed out previously, the invention resides not so much in the particular way in which the compliant core is centered in the casing 12, but in the fact that the compliant core is provided in the casing 12. Also, as above pointed out, the compliant core is made of material compatible with the sodium but having a structure which inherently returns to its original volume or original position so that when the sodium expands or contracts, corresponding expansion or contraction will occur of the compliant core itself before any hydrostatic forces are created which would cause disruption of the casing 12.

FIG. 6 shows in cross-section, another modified form of spring support or spider 420 for the compliant core 10 in the casing 12. In this case the legs 430 of the spider may be somewhat inclined from the main plane of the spider 420 in order to provide a spring effect. The cross-sectional view of FIG. 7 simply shows an initial elliptical structure for the polypropylene material of the compliant core 10.

The compliant core may preferably be initially backfilled with an inert gas such as nitrogen at any desired pressure which may tend to expand the compliant core 10 from the elliptical condition shown in FIG. 7 to the cylindrical condition shown in FIGS. 3 through 6. This will provide an initial bias on the compliant core so that the weight of the sodium in melted form when it is introduced may compress the compliant core toward a somewhat elliptical cross-section, it being kept in mind that the entire variation is a 4% variation in volume and therefore a lesser variation in any single plane. As the sodium cools and sets, the compliant core will expand to fill the void that is created by the possible maximum 4% variation in volume. The pressure of the insert gas within the compliant core will not per se affect this expansion, it being desired that the elasticity and resilience of the material of the compliant core primarily perform this expansion job in order to obviate voids which may otherwise occur.

As the volume of the sodium changes owing to variations in temperature during use of the conductor, the compliant core will take up the void and provide, in effect, a safety area so that excess hydrostatic pressure will not be exerted on the copper conductor, but instead will be exerted on the more elastic and resilient compliant core 10.

In order to prevent contamination of the sodium or limit contamination of the sodium where an inert gas is used within the compliant core 10, the compliant core 10 is capped and sealed by the cap 40 and may be sealed at regular intervals, such as every 30cm, by sealing together the boundaries of the compliant core 10 at the sections 41 to create a plurality of discrete gas-filled sections so arranged that the bursting of any one section will not result in the complete loss of all the gas in the compliant core 10, and thus will not result in major contamination of the sodium.

The conductor itself is terminated by a solid copper terminal member 50 secured in any suitable manner, as by welding or otherwise to the end 51 of the corrugated copper sheet 12 and an appropriate plug 53 is provided for the terminal member 50 and held in place in any suitable manner in order to contain the sodium and make good contact therewith.

In the foregoing, the present invention has been described solely in connection with preferred illustrative embodiments thereof. Since many variations or modifications of this invention will now be obvious to those skilled in the art, it is preferred that the scope of this disclosure be determined, not by the specific disclosures herein contained, but only by the appended claims.

What is claimed is:

1. A conductor having an outer longitudinal relatively thin electrically conductive casing and an interior electrically conductive metal in said casing in electrically conductive contact therewith;

the said interior electrically conductive metal having a different coefficient of thermal expansion than the outer relatively thin conductive casing;

a core member substantially axially positioned along the interior of said outer casing;

said interior electrically conductive metal filling the space between said outer electrically conductive casing and said core member;

said core member being radially flexible and resilient;

said core member being resiliently compressed when said interior metal expands;

said core member expanding when said interior metal contracts; said core member remaining in contact with said interior metal, preventing the occurrence of voids in said interior metal between said interior metal and said core member and between said interior metal and said casing while absorbing pressures that may be generated by the difference in coefficient of expansion of the interior metal and said casing.

2. The conductor of claim 1 wherein the casing is formed of copper, the interior metal is sodium, and the core member is of a material compatible with sodium and which does not react with sodium in the liquid or solid form of sodium.

3. The conductor of claim 2 wherein the copper casing is a flexible corrugated tube and the core member is a substantially tubular member supported therein.

4. The conductor of claim 3 wherein the core member is made of a polypropylene material.

5. The conductor of claim 3 wherein a plurality of resilient members are provided within the casing for supporting the core member;

said resilient members each having a portion engaging the interior of the casing to position the resilient member within the casing and a central portion engaging the core member to position the core member axially of the casing;

said resilient members being spaced from each other and extending transversely of the casing;

said resilient members having openings establishing a continuous uninterrupted path of sodium within said casing.

6. The conductor of claim 5 wherein said tubular core member may initially have an elliptical cross-section when installed and will accommodate itself to changes in interior pressure of the sodium owing to thermally created variations in the volume thereof.

7. The conductor of claim 5 in which the tubular core member is filled with an inert gas.

8. The conductor of claim 7 wherein the tubular core member has a series of bulkhead partitions creating a longitudinal series of gas-filled capsules and thereby limiting the loss of inert gas on occurrence of a break in the wall of the tubular core member.

9. The conductor of claim 5 wherein a conductive metal connector is inserted in the end of the casing, the end of the tubular core member adjacent the connector is capped and a plug in the end of said connector is provided; said sodium extending into said connector and into engagement with said plug.

10. The conductor of claim 2 wherein the core member is initially of elliptical cross-section.

11. The conductor of claim 10 wherein the core member has at least one longitudinal indentation in its wall.

* * * * *